United States Patent Office 2,768,928
Patented Oct. 30, 1956

2,768,928

MICROBIOLOGICAL OXIDATION TO LACTONES

Josef Fried, New Brunswick, and Richard W. Thoma, Somerville, N. J., assignors to Olin Mathieson Chemical Corporation, New York, N. Y., a corporation of Virginia No Drawing. Application August 5, 1953,
Serial No. 372,595

8 Claims. (Cl. 195—51)

This invention relates to, and has for an object the provision of, certain steroids and methods for their production.

More particularly, it is an object of this invention to provide a fermentation process involving the use of molds for the oxidation of cyclopentanophenanthrenes and hydrogenated cyclopentanophenanthrenes to compounds containing a lactone structure (e. g. progesterone to testololactone). These lactones are useful as hormones and may be transformed to other useful products. Thus, the testololactone obtained from progesterone may be used as a protein-anabolic agent or reduced to a 4,5-dihydrotestololactone which is useful for the same purpose.

The oxidation may be effected by either bringing together, in an aqueous medium, the steroid, oxygen, and enzymes of non-proliferating cells of the desired mold or, preferably, by including the steroid in an aerated culture of the mold.

When aerated culture is used, the oxidation is effected in the presence of the mold by adding the steroid (or a mixture of steroids) to the culture during the incubation period, or by including it in the nutrient medium prior to inoculation. In any case, assimilable sources of nitrogenous materials for growth promotion and carbon-containing substances as energy sources should be present in the culture medium. Also, an adequate air supply should be maintained during the oxidation, e. g. by the conventional techniques of (1) exposing a large surface of the medium to air or (2) aerating in submerged culture.

The molds utilizable in the practice of the invention include Aspergilli, such as *Aspergillus flavipes* ATCC 11013; Penicillii, such as *Penicillium chrysogenum* Wisconsin 49–133, and *Penicillium citrinium* ATCC 8506. Cultures of these molds have been deposited with and are available from the American Type Culture Collection, Washington, D. C. (except *Penicillium chrysogenum*, Wisconsin 49–133, which is available from the Univ. of Wisconsin, Dept. of Botany).

In general, the conditions of culturing the molds for the purposes of this invention are (except for the inclusion of the steroid to be oxidized) the same as those of culturing such microorganisms for the production of other metabolites. Thus, the nutrient medium essentially comprises assimilable sources of nitrogen for growth and carbon for energy.

The nitrogen source materials may be organic (e. g. soybean meal, cornsteep liquor, meat extract, and/or distillers solubles) or synthetic (i. e. composed of simple, synthesizable organic or inorganic compounds such as ammonium salts, alkali nitrates, amino acids, urea or thiourea.)

As to the energy source material, lipids, especially (1) fat acids having at least 14 carbon atoms, (2) fats or (3) mixtures thereof, are preferred. Examples of such fats are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin; and illustrative fat acids include stearic, palmitic, oleic, linoleic and myristic acids.

Other carbon-containing materials may also be used. For example such materials as glycerol, glucose, fructose, sucrose, lactose, maltose, dextrins, starches, whey, etc., are adequate carbon source materials. These materials may be used either in purified state or as concentrates, such as whey concentrate, corn, wheat or barley mash; or mixtures of the above may be employed. It is to be noted, however, that the steroid is added to the fermentation medium essentially as a precursor and not as an energy source.

The media used in the process of the invention may contain other precursors in addition to the steroids to obtain other valuable products. For example, an assimilable source of cobalt may be included where a vitamin $B_{12}$ is desired, and the by-product then recovered by conventional methods.

As the steroid, any cyclopentanophenanthrene (including hydrogenated cyclopentanophenanthrenes) containing an oxy or oxo group in the 3-position and having a substituent (especially an oxy- and/or oxo-containing substituent) at $C_{17}$ may be used. [The term oxy, as used herein, includes both free hydroxy and etherified or esterified hydroxy, e. g., alkoxy or alkanoyloxy.] These steroids include the pregnenes, pregnanes, androstenes and androstanes, the pregenes being preferred. Thus, among the steroids utilizable in the process of the invention are: progesterone; testosterone; Reichstein's Compound "S" (11-desoxy-17-hydrocorticosterone); estriol; estradiol; testosterone fatty acid esters (e. g., acetate, propionate, butyrate, etc.); 11-epi-hydrocortisone; 17-hydroxy - 11 - dehydrocorticosterone; 17-hydroxycorticosterone; $\Delta^4$-androstenedione-3,17; the 3,20-pregnanediols and allopregnanediols; pregnanedione; desoxycorticosterone; hydroxyprogesterones, such as the $6\alpha,6\beta,7\alpha,8,9,11\alpha,11\beta,14,15\alpha,15\beta$ or $16\alpha$ hydroxy progesterones; ketoprogesterones, such as the 11,12 or 6 keto progesterones; and $\Delta^4$-3-keto etiocholanic acid. Also utilizable are the known dehydro [the term "dehydro" having the accepted meaning "dehydrogenated" and not "dehydrated"] derivatives of the above-mentioned steroids, (e. g., those having a C=C linkage in any of the following positions: 6,7; 8,9; 9,11; 11,12; 8,14; or 14,15).

The following examples are illustrative of the invention but are not to be construed as a limitation thereof.

EXAMPLE

*Oxidation of progesterone*

(a) *Fermentation.*—A medium of the following composition is prepared: cornsteep liquor solids, 3.0 g.; $NH_4H_2PO_4$, 3.0 g.; $CaCO_3$, 2.5 g.; soybean oil, 2.2 g.; progesterone, 0.5 g.; and distilled water to make 1 liter. The medium is adjusted to pH $7.0\pm0.1$. Then, 100 ml. portions of the medium are distributed in 500 ml. Erlenmeyer flasks, and the flasks plugged with cotton and sterilized in the usual manner (i. e. by autoclaving for 30 minutes at 120° C.). When cool, each of the flasks is inoculated with 5–10% of a vegetative inoculum of *Aspergillus flavipes* ATCC 11013, the inoculum having been grown from stock cultures (lyophilized vial or agar slant) for 48–72 hours (with or without transfer and additional incubation for 24–48 hours) in a medium of the following composition adjusted to pH $7.0\pm0.1$: cornsteep liquor solids, 15 g.; brown sugar, 10 g.; $NaNO_3$, 6 g.; $ZnSO_4$, .001 g.; $KH_2PO_4$, 1.5 g.; $MgSO_4.7H_2O$, 0.5 g.; calcium carbonate, 5 g.; lard oil, 2 g.; distilled water to make 1 liter. The flasks are then placed on a reciprocating shaker and mechanically shaken at 25° C. for 3 days. The contents of the flasks are then pooled and, after the pH of the culture is adjusted to about 4±0.2 with sulfuric acid, filtered (using Seitz filter pads or other suitable filtering media) to separate the mycelium from the fermented medium.

(b) *Isolation of products from the culture filtrate.*—1600 ml. culture filtrate obtained as described in (a) from fermentation involving the use of 1 g. progesterone is extracted four times with one-liter portions of chloroform and the combined extracts are evaporated to dryness in vacuo. The residue is dissolved in 20 ml. 80% methanol and the resulting solution is extracted four times with 20 ml. portions of hexane. The resulting methanol solution is concentrated in vacuo to a small volume and the residue is extracted twice with 25 ml. portions of chloroform. The combined chloroform extracts are evaporated to dryness, then taken up in a small amount of acetone. Crystallization occurs spontaneously yielding a product which, on recrystallization from acetone, yields a product having the following characteristics: M. P. 207–209° C. $[\alpha]_D^{23}$+42.6° (c=1.0 in chloroform);

U. V.: $\lambda_{max}^{alc.}$ 237m$\mu$ ($\epsilon$=17,900)

I. R.: $\lambda_{max}^{nujol}$ 5.82$\mu$ (lactone carbonyl)

5.99$\mu$ and 6.18$\mu$ ($\Delta^4$-3-ketone).

*Analysis.*—Calcd. for $C_{19}H_{26}O_3$: C, 75.47; H, 8.67. Found: C, 75.90; H, 8.83.

Direct comparison with an authentic sample of testololactone (Levy et al., J. Biol. Chem., 171, 71 [1947] and Shemano et al., Proc. Soc. Exptl. Biol. Med., 78, 612 [1951]) by melting point, mixed melting point and infrared spectrum proves that the product obtained is identical with an authentic sample of testololactone.

Catalytic reduction with $PtO_2$ in glacial acetic acid (or with Raney nickel or any other noble metal catalyst) yields a mixture of 4,5$\alpha$- and 4,5$\beta$-dihydrotestololactone.

Substantially following the procedure of the recited example but using other molds and/or steroid precursors, analagous lactones are produced.

This invention may be variously otherwise embodied within the scope of the appended claims.

We claim:

1. The process which comprises subjecting a $C_{17}$-substituted steroid, containing in the 3-position a substituent of the group consisting of oxy and oxo, to the action of enzymes of a mold selected from the group consisting of *Aspergillus flavipes* ATCC 11,013; *Penicillium chrysogenum* Wis. 49–133; and *Penicillium citrinium* ATCC 8506, in an aqueous medium containing assimilable sources of carbon and nitrogen, and recovering a lactone from the medium.

2. The process of claim 1 wherein the enzymes are derived from a growing culture.

3. The process of claim 2 wherein the steroid is a pregnene.

4. The process of claim 1 wherein the steroid is progesterone and the lactone is testololactone.

5. The process which comprises subjecting a $C_{17}$-substituted steroid, containing in the 3-position a substituent of the group consisting of oxy and oxo, to the action of enzymes of *Aspergillus flavipes* ATCC 11,013, in an aqueous medium containing assimilable sources of carbon and nitrogen, and recovering a lactone from the medium.

6. The process of claim 5 wherein the steroid is progesterone and the lactone is testololactone.

7. The process which comprises subjecting a $C_{17}$-substituted steroid, containing in the 3-position a substituent of the group consisting of oxy and oxo, to the action of enzymes of a mold of the genus Penicillium selected from the group consisting of *Penicillium chrysogenum* Wis. 49–133 and *Penicillium citrinium* ATCC 8506, in an aqueous medium containing assimilable sources of carbon and nitrogen, and recovering a lactone from the medium.

8. The process of claim 7 wherein the steroid is progesterone, and the lactone is testololactone.

References Cited in the file of this patent

UNITED STATES PATENTS

| | | |
|---|---|---|
| 2,602,769 | Murray et al. | July 8, 1952 |
| 2,649,400 | Murray et al. | Aug. 18, 1953 |
| 2,649,402 | Murray et al. | Aug. 18, 1953 |

OTHER REFERENCES

Levy et al.: Jour. Biol. Chem., 171 (1947), pages 78 and 79.